United States Patent
Vemula et al.

(10) Patent No.: US 9,116,991 B2
(45) Date of Patent: Aug. 25, 2015

(54) SEARCHING ENCRYPTED ELECTRONIC BOOKS

(75) Inventors: Gopal Venu Vemula, San Jose, CA (US); Paul M. Franceus, San Francisco, CA (US)

(73) Assignee: Google Inc., Mountain View, CA (US)

( * ) Notice: Subject to any disclaimer, the term of this patent is extended or adjusted under 35 U.S.C. 154(b) by 843 days.

(21) Appl. No.: 13/211,191

(22) Filed: Aug. 16, 2011

(65) Prior Publication Data

US 2013/0046765 A1 Feb. 21, 2013

(51) Int. Cl.
*G06F 17/30* (2006.01)

(52) U.S. Cl.
CPC ............... *G06F 17/30864* (2013.01)

(58) Field of Classification Search
USPC ............................................. 707/706, 741
See application file for complete search history.

(56) References Cited

U.S. PATENT DOCUMENTS

| | | | | |
|---|---|---|---|---|
| 6,633,877 | B1 * | 10/2003 | Saigh et al. ........................... | 1/1 |
| 7,051,022 | B1 * | 5/2006 | Faisal ..................................... | 1/1 |
| 8,150,152 | B2 * | 4/2012 | Shiraishi ....................... | 382/166 |
| 8,321,485 | B2 * | 11/2012 | Yasuda et al. .................. | 707/830 |
| 8,352,876 | B2 * | 1/2013 | Batarseh et al. ............... | 715/776 |
| 8,468,365 | B2 * | 6/2013 | Gueron et al. ................ | 713/190 |
| 2002/0150239 | A1 | 10/2002 | Carny et al. | |
| 2006/0265371 | A1 | 11/2006 | Edmond et al. | |
| 2007/0201702 | A1 * | 8/2007 | Hendricks et al. ............ | 380/282 |
| 2008/0005151 | A1 * | 1/2008 | Iwakura ........................ | 707/102 |
| 2009/0147960 | A1 * | 6/2009 | Maeda et al. ................. | 380/277 |
| 2009/0235361 | A1 | 9/2009 | Sloo et al. | |
| 2010/0019034 | A1 * | 1/2010 | Sherf ............................. | 235/382 |
| 2011/0185191 | A2 * | 7/2011 | Hendricks ..................... | 713/193 |
| 2012/0060000 | A1 * | 3/2012 | Zhu ............................... | 711/154 |
| 2012/0270188 | A1 * | 10/2012 | Dalton .......................... | 434/178 |
| 2015/0067887 | A1 * | 3/2015 | Wang et al. .................... | 726/27 |

FOREIGN PATENT DOCUMENTS

| | | |
|---|---|---|
| KR | 10-2002-0024484 A | 3/2002 |
| WO | WO 2010/144123 A1 | 12/2010 |

OTHER PUBLICATIONS

PCT International Search Report and Written Opinion, PCT/US2012/050616, Feb. 21, 2013, 8 Pages.

* cited by examiner

*Primary Examiner* — Kim Nguyen
(74) *Attorney, Agent, or Firm* — Fenwick & West LLP (57) ABSTRACT

An e-book server creates index information for encrypted e-book content. The index information is used by a reader module to efficiently search the encrypted content. To create the index information, the e-book server identifies logical partitions of an e-book that include phrases, and creates encrypted segments including a portion of the e-book content that is not necessarily aligned with the logical partitions of the e-book. The e-book server then stores index information including a mapping between the encrypted segments and the phrases located in the logical partitions.

17 Claims, 7 Drawing Sheets

SEARCHING ENCRYPTED ELECTRONIC BOOKS

BACKGROUND

1. Field of Disclosure

The disclosure generally relates to the field of searching text in electronic books, in particular to searching encrypted text in electronic books.

2. Background Information

Electronic book (hereinafter "e-book") readers store encrypted electronic content for a book. The encrypted content beneficially prevents unauthorized use and distribution of the e-book. The encryption, however, also leads to various challenges. For example, searching the encrypted e-book content becomes a challenge. One method to search the e-book content is to decrypt the entire e-book and search the decrypted content. Such a method, however, is inefficient because every search involves decrypting the entire content before a search can be performed.

SUMMARY OF THE INVENTION

The above-described and other issues are addressed by a computer-implemented method, computer-readable medium, and computer system for creating and storing index information for an e-book. Embodiments of the method comprise identifying logical partitions of an e-book having content, the content comprising a plurality of phrases located within one or more of the logical partitions, and creating a plurality of encrypted segments for the e-book, each segment comprising a subset of the e-book content. Additionally, the method comprises storing index information including a mapping between the phrases located within the one or more logical partitions and the plurality of encrypted segments, in which the mapping indicates for a phrase, one or more encrypted segments that include the phrase.

Embodiments of the computer readable medium store instructions for performing the method for creating and storing index information for an e-book. Embodiments of the performed method include identifying one or more logical partitions of an e-book having content, the content including a plurality of phrases located within one or more of the logical partitions, and creating a plurality of encrypted segments for the e-book, with each segment comprising a subset of the e-book content. Additionally, the method includes storing index information including a mapping between the phrases located within the one or more logical partitions and the plurality of encrypted segments, where the mapping indicates, for a phrase, one or more encrypted segments that include the phrase.

Embodiments of the computer system include a computer readable medium that stores instructions for performing the method for creating and storing index information for an e-book. Embodiments of the performed method include identifying one or more logical partitions of an e-book having content, the content including a plurality of phrases located within one or more of the logical partitions, and creating a plurality of encrypted segments for the e-book, with each segment including a subset of the e-book content. Additionally, the method includes storing index information including a mapping between the phrases located within the one or more logical partitions and the plurality of encrypted segments, where the mapping indicates, for a phrase, one or more encrypted segments that include the phrase.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The computing environment described herein enables efficient search in encrypted e-book content. The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
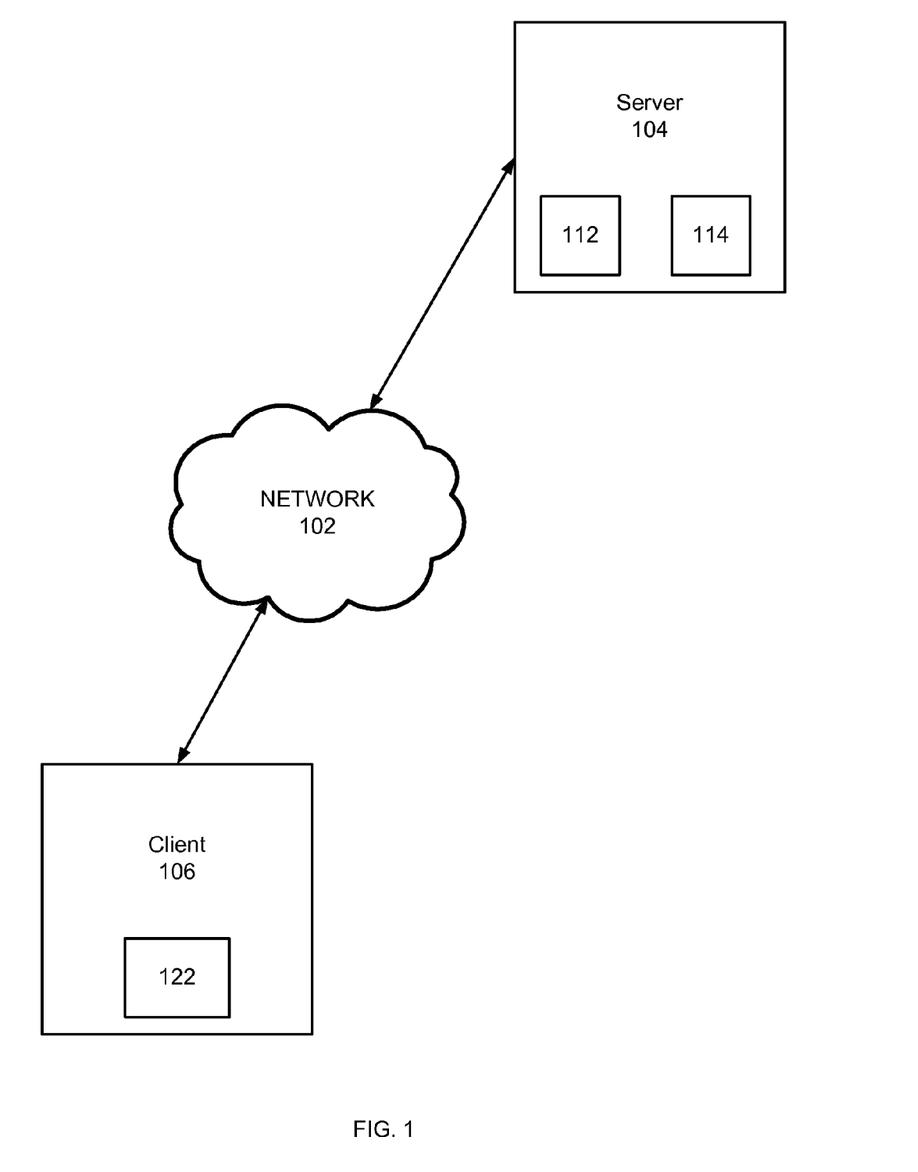
FIG. 1 is a block diagram illustrating a computing environment for creating and storing index information for e-books that enables efficient searching according to one embodiment.

Referring to FIG. 1, the computing environment for creating and storing index information comprises an e-book server 104 and an e-book client 106 communicatively coupled to each other through a network 102.

The e-book server 104 is a computing device with a processor and a memory that stores and indexes e-book content. The e-book server 104 comprises an e-book database 114 and an indexing module 112. The e-book database 114 receives and stores e-books from an external source (not shown).

The e-books include electronic content, primarily textual in nature, including electronic books, newspapers, magazines and other textual publications. Additionally, the electronic content is organized into logical partitions such as paragraphs, pages, sub-chapters, and chapters. In one embodiment, the e-book database 114 also receives and stores metadata associated with the e-book's electronic content indicating locations of logical partitions in the content. Examples of such metadata include the locations of paragraph breaks, page breaks, sub-chapter breaks, and chapter breaks. In another embodiment, the metadata also indicates the relative hierarchy of logical partitions amongst each other. For example, the metadata may indicate that paragraphs 1-4 are located within page 1.

The database 114 may store encrypted or decrypted copies of e-books. Additionally, the database 114 receives index information for the e-books from the indexing module 112 and stores such information. The indexing module 112 retrieves e-books from the database 114 and creates index information for the e-books. The created index information indicates the location of the phrases in the encrypted e-book. In one embodiment, the index information maps phrases (i.e., one or more words) in an e-book with e-book segments that include the mapped phrases. An e-book segment is a block of encrypted text from one or more logical partitions in an e-book. Additionally, a segment may not necessarily align with the boundaries of the logical partitions, and a segment may include encrypted text from parts of one or more logical partitions. A segment would typically include a subset of the text in the e-book, so that the e-book includes multiple segments. The indexing module 112 stores the created index information in the e-book database 114. The indexing module 112 is further described in reference to FIG. 2.

The client 106 is a computing device with a processor and a memory that includes an eReader module 122 for displaying and efficiently searching the e-book content. The eReader module 122 retrieves from the e-book server 104 the e-book content and its corresponding index information. Upon receiving a search phrase from the user, the eReader module 122 determines from the index information the segments and/or logical partitions that include the searched phrase. The eReader module 122 then displays identifications for the determined segments and/or logical partitions to the user. For example, the eReader module 122 displays a screen indicating that the phrase "wisdom" is present in logical partition "page 8."

The eReader module 122 subsequently receives a selected identification from the user, decrypts the content corresponding to the selection and displays the decrypted content. In one embodiment, the eReader module 122 searches the decrypted segment, locates the position of the searched phrase in the decrypted segment, and displays the part of the decrypted segment that includes the search phrase. In another embodiment, the eReader module 122 also places the cursor next to the location of the searched phrase in the displayed part.

In this manner, the e-book server 104 creates index information that is beneficially used by the eReader module 122 to conduct efficient searches. Instead of decrypting all of the e-book content, the eReader module 122 uses the index information to locate the relevant segments and decrypts one or more relevant segments for display to the user. Because the eReader module 122 is not decrypting the entire e-book content for the search, the user experience is much improved and the user need not wait for decryption of entire content to see the search results.

The eReader module 122 in the client 106 and e-book server 104 are communicatively coupled to each other through a network 102. The network 102 represents the communication pathways between the client 106 and the server 104. In one embodiment, the network 102 is the Internet. The network 102 can also use dedicated or private communications links that are not necessarily part of the Internet.

Indexing Module

Figure 2:
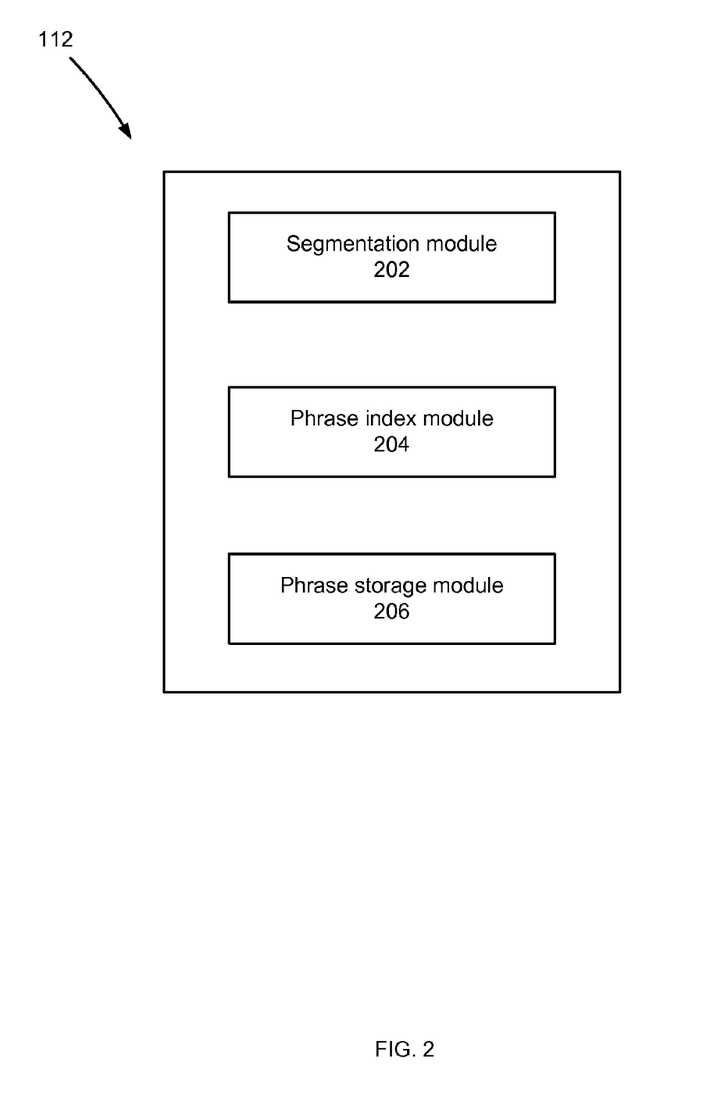
FIG. 2 is a block diagram illustrating an indexing module in greater detail for creating index information according to one embodiment.

FIG. 2 is a block diagram illustrating the indexing module 112 in greater detail according to one embodiment. The indexing module 112 comprises a segmentation module 202, a phrase index module 204 and a phrase storage module 206.

The segmentation module 202 retrieves the content for an e-book from the e-book database 114 and creates segments including encrypted content for one or more logical partitions in the e-book. In one embodiment, the segmentation module 202 segments the e-book content based on the metadata associated with the content. For example, the segmentation module 202 may determine from the metadata the boundaries of, or the content within, the logical partitions (such as paragraphs or pages), encrypt the content of one or more logical partitions, and store the encrypted content into a segment. In another embodiment, the segmentation module 202 analyzes the e-book content in the logical partitions to determine textual characteristics indicating boundaries, such as line breaks or line spacing between the text in the e-book. The segmentation module 202 treats these textual characteristics as a proxy for boundaries of logical partitions like paragraph, page or chapter breaks. The segmentation module 202 then encrypts content within the detected boundaries of the logical partitions and creates segments including the encrypted content. Accordingly, the segments include encrypted versions of the content included in their corresponding logical partitions. In one embodiment, the segmentation module 202 stores a segmentation index that includes, for each segment, an identification (such as an ordinal number) of the segment and a reference that points to the location of the corresponding logical partition in the e-book.

The phrase index module 204 creates and stores index information used to locate a phrase in an e-book without decrypting the entire content of the e-book. A phrase includes one or more words or a combination of words. For example the word "tug" and three words "tug-of-war" can each be a phrase. In some languages, a phrase can be a compound word that includes parts of two words to form one compound word.

In one embodiment, the index information for an e-book includes a phrase index that maps various phrases with the segments including those phrases. In another embodiment, the index information also includes a manifest that maps an e-book logical partition to a segment that includes encrypted text for the logical partition. Some or all segments may include encrypted text for multiple logical partitions. The manifest, for such segments, indicates the logical partitions corresponding to such segments. In one embodiment, the manifest indicates a hierarchy of logical partitions that correspond to a segment. For example, the manifest indicates that section 2 of chapter 3 corresponds to segment 6. In another example, the manifest also indicates that section 2 corresponds to "pages 32-34."

To create a phrase index, the phrase index module 204 searches the logical partitions that include decrypted text corresponding to the encrypted text in a segment. Based on the search, the phrase index module 204 determines various phrases included in the segment. Upon detecting a phrase, the phrase index module 204 stores information in a phrase index indicating that the segment includes the detected phrase. The phrase index module 204 repeats this process for various segments, and populates the phrase index with phrases and their corresponding segments. An example entry in the phrase index indicates that phrase "wisdom" is located in segments 8, 12 and 18.

In this manner, the phrase index module 204 beneficially stores a proximate, and not an exact location, of a phrase. Because a segment may include more than one phrase, determining a segment that includes a phrase does not lead to determining where exactly the phrase exists in the segment. Accordingly, the phrase index module 204 beneficially prevents an unauthorized user from bypassing decryption and compiling an e-book based on its associated phrase index because the proximate indexing obfuscates the exact ordering of the text.

To create a manifest, the phrase index module 204, in one embodiment, analyzes the metadata associated with the e-book content. The metadata indicates parts of e-book content that correspond to the various logical partitions. In one embodiment, the metadata also indicates the relative hierarchy of logical partitions amongst each other. In another embodiment, the phrase index module 204 determines these logical partitions by analyzing the textual characteristics indicating boundaries, such as by detecting line spacing or line breaks, words like "chapter" or "section," or numbers indicating a chapter number, section number or page number. In yet another embodiment, the phrase index module 204 also determines the relative hierarchy amongst the logical partitions based on the detected words. For example, the phrase index module 204 determines the sections in a chapter after detecting, in a chapter, the word "section" followed by a number.

Regardless of how the phrase index module 204 determines the logical partitions, the phrase index module 204 determines the segments corresponding to these logical partitions. In one embodiment, the phrase index module 204 determines the corresponding segments based on the segmentation index created by segmentation module 202. The phrase index module 204 analyzes the segmentation index to determine the storage location for various segments. The phrase index module 204 then compares the storage locations of various segments with storage locations of the encrypted version of the logical partitions, and determines a match between a logical partition and a segment if their storage locations overlap. The matched logical partitions and segments are then stored in the manifest. In this manner, the phrase index module 204 creates a manifest including segments and their corresponding logical partitions. An example entry in a manifest indicates that segment 4 corresponds to "pages 2-3." Another example entry indicates that segment 4 corresponds to "section 3 of chapter 1."

Figure 7:
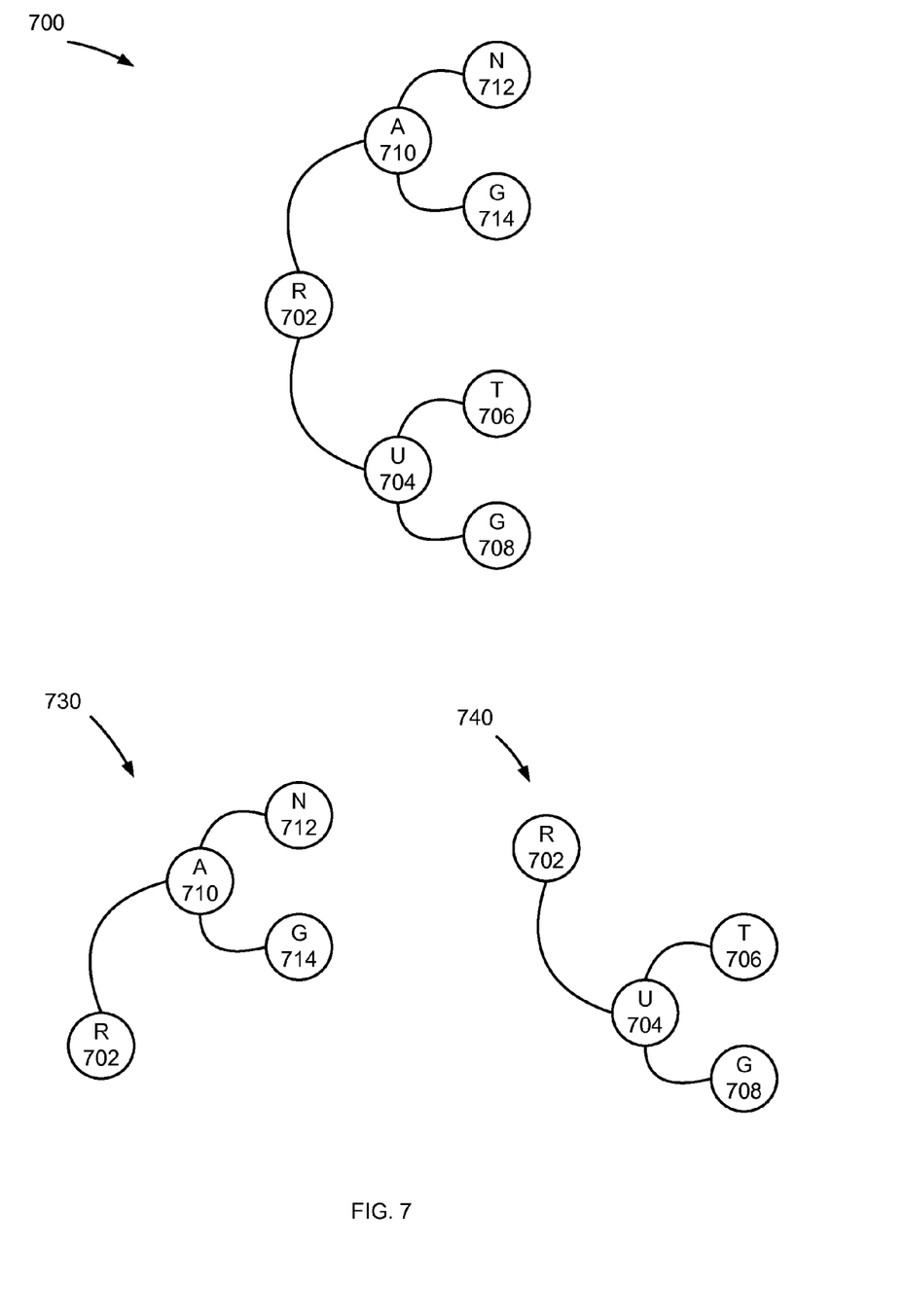
FIG. 7 illustrates a tree-based structure, specifically a trie storing phrases beginning with letters "RA" and "RU."

The phrase storage module 206 stores the phrases in the phrase index in a data structure optimized for phrase retrieval. In one embodiment, the phrases are stored in an ordered tree data structure like a trie. FIG. 7 illustrates a tree-based structure, specifically a trie storing phrases beginning with letters "RA" and "RU." As illustrated in FIG. 7 discussed further below, each node in the tree stores a subsequent letter of a phrase in an e-book. Accordingly, the phrase "ran" is stored in three connected nodes 702, 710, 712, and each connected node stores a letter of the phrase. As described in reference to FIG. 3 below, such storage beneficially allows the eReader module 122 to suggest search phrases as the user types the initial letters of the search phrase.

Additionally, in one embodiment, the phrase storage module 206 stores phrases starting with different letters, or letter combinations, in different tree data structures. For example, in one embodiment, the phrase storage module 206 stores nodes 702, 710, 712 and 714 as a first tree 730 storing phrases beginning with letters "RA," and stores nodes 702, 704, 706 and 708 as a second tree 740 storing phrases beginning with "RU." Such storage beneficially enables the eReader module 122 to provide a faster and more efficient search experience as described below in reference to FIG. 3.

eReader Module

Figure 3:
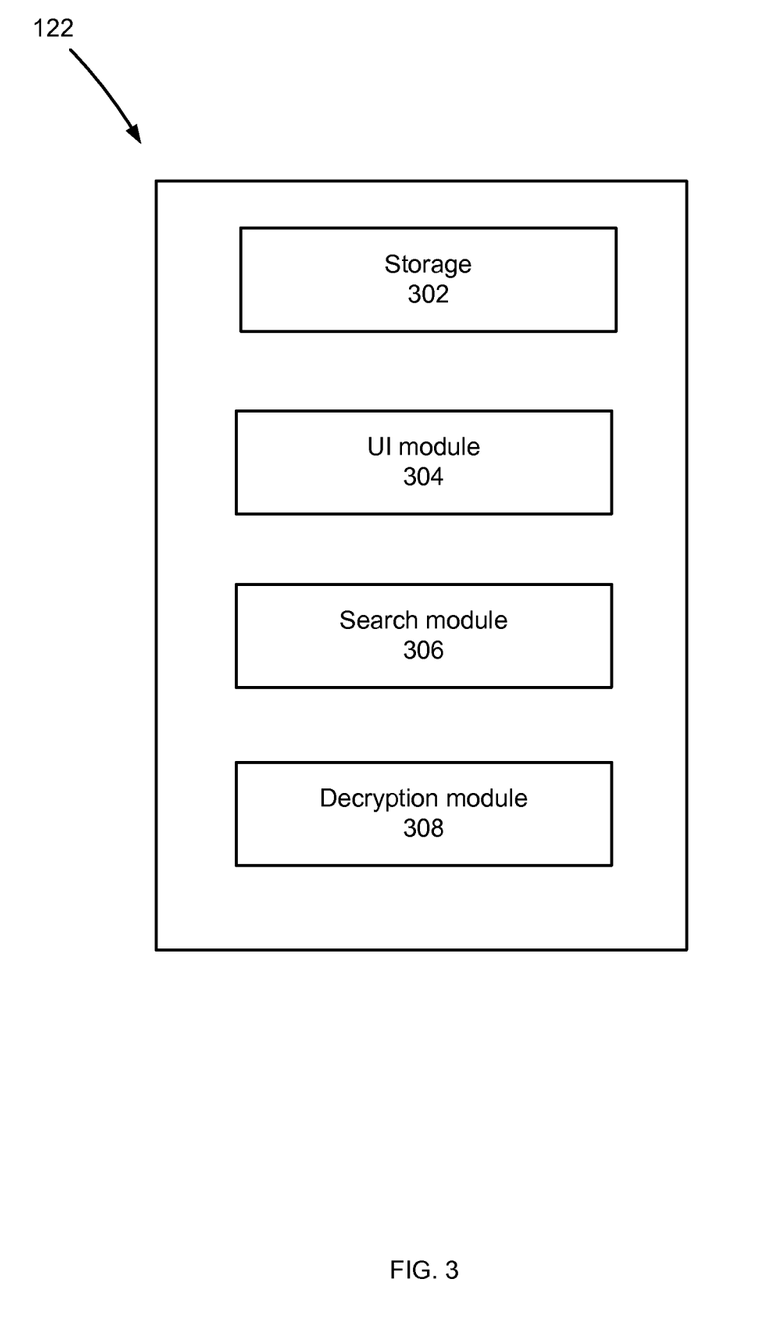
FIG. 3 is a block diagram illustrating an eReader module in a client in greater detail according to one embodiment.

FIG. 3 is a block diagram illustrating an eReader module 122 in a client 106 in greater detail according to one embodiment of the present disclosure. The eReader module 122 comprises a storage module 302, a user interface (UI) module 304, a search module 306 and a decryption module 308.

The storage 308 receives and stores encrypted e-books and their corresponding index information from the e-book server 104.

The UI module 304 provides the interface between the user and the eReader module 122. The UI interface 304 receives user input indicating various requests from the user such as selection of a particular e-book, a particular page in the e-book or a search request for searching a phrase in the e-book. In response to receiving such user inputs, the UI module 302 displays the requested cover of the e-book, page of the e-book, or a search bar for receiving the search phrase from the user. In one embodiment, after receiving one or more initial letters of the search phrase, the UI module 302 transmits the initial letters to the search module 306, receives suggested search phrases from the search module 306 and displays the suggested search phrases to the user. Upon receiving a search phrase from the user, the UI module 304 transmits the search phrase to the search module 306, receives the search results from the search module 306 and displays the search results to the user.

The search module 306 determines and recommends potential search phrases to the user. After receiving the first letter from the UI module 304, the search module 306 analyzes the phrase index associated with the active e-book (i.e., the e-book currently being searched by the user). The search module 306 then determines the tree data structures having root nodes beginning the received letters. If only one such tree exists, the search module 306 loads the tree in memory for further analysis. Otherwise, the search module 306 waits to receive the next letter and analyzes the trees with the root node and subsequent node matching the two received letters. The search module 304 keeps receiving letters until only one tree includes all the letters in the received order. The search module 304 then loads the matched tree in memory, traverses the nodes of the loaded tree to determine the node storing the last received letter, and recommends search phrases for the user based on the nodes following the determined node with the last received letter.

For example, referring to FIG. 7 again, after the user types letters "R" and "A," the search module 304 loads tree 700 into the memory, traverses the matched tree and determines the location of node 710 that includes the letter "A" following the letter "R." The search module 304 then determines that the only existing phrases that start with "RA" in the e-book are "Ran" and "Rag" because node 710 is only followed by nodes 712 and 714. Accordingly, the user may successfully search for "Ran" or "Rag," and any other search phrase starting with "RA" would not lead to any results. The search module 306 therefore uses the tree data structure to beneficially suggest the two search phrases with potential results to the user.

In one embodiment, tree 700 is divided into two separate trees 730, 740. Accordingly, the search module 304 loads tree 730 after the search module 306 receives letters "R" followed by "A" from the UI module 304. Because tree 730 only includes phrases beginning with "RA" instead of "R," tree 730 is smaller than tree 700. The relatively smaller size of tree 730 beneficially enables the search module 304 to load the tree in the memory and traverse the tree faster than the time required to load and traverse the larger tree 700. Accordingly, the smaller tree 730 beneficially enables the search module 304 to recommend suggested search phrases in a fast and efficient manner to the user.

As depicted in FIG. 3, after the search phrases are recommended to the user, the search module 306 receives a selected search phrase from the user and searches the index information to determine the location of the search phrase in the e-book. To perform this search, the search module 306 analyzes the index information and determines the corresponding segments that include the search phrase. The search module 304 then transmits identifications of the determined segments to the UI module 304 and the UI module displays the segment identifications as search results.

In one embodiment, after determining the segments corresponding to the search phrase, the search module 306 analyzes the manifest to determine the logical partitions (i.e., page numbers, chapter numbers, etc.) corresponding to the determined segments. The search module 306 then transmits the determined logical partitions to the UI module 304 and the UI module 304 displays the determined logical partitions as search results. In one embodiment, the index information indicates a hierarchy of logical partitions corresponding to the determined segment, and the search module 306 transmits the corresponding hierarchy for display to the user. For example, the index information may indicate that page 3 includes paragraphs 18-22. Accordingly, if a searched phrase is present in paragraph 20, the hierarchy included in the index information is used to display an indication that the searched phrase is present on page 3 at paragraph 20.

In one embodiment, the search module 306 receives a search phrase and an identification for a selected logical partition or a segment from the UI module 304. The search module 306 transmits the received identification to the decryption module 308, receives decrypted data for the identified segment or logical partition, and searches the decrypted data for the location of the search phrase. The search module 306 then transmits the decrypted data and location of the search phrase to the UI module 304, and the UI module 304 displays the decrypted data and highlights the search phrase in the displayed data.

The decryption module 308 decrypts the encrypted e-book content for display to the user. The decryption module 308 receives a request from the UI module 304 or the search module 306 indicating the part of the e-book requested or searched by the user. The decryption module 308 receives an identification of a requested logical partition or a segment from the UI module 304 or the search module 306, retrieves the identified encrypted part from the e-book, decrypts the encrypted part and transmits the decrypted part to the UI module 304 or the search module 306.

Computer Architecture

Figure 4:
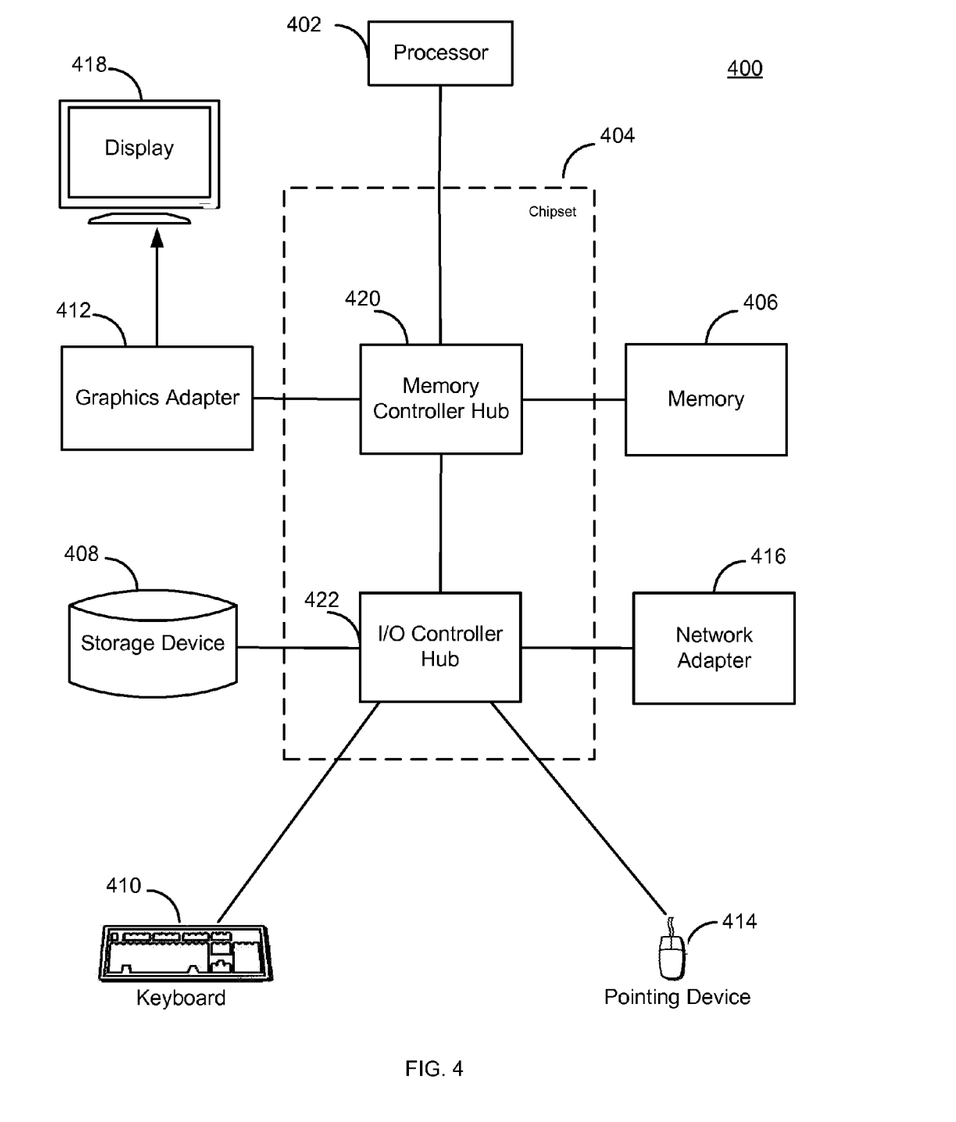
FIG. 4 is a block diagram illustrating an example of a computer for use in the computing environment shown in FIG. 1 according to one embodiment.

The entities shown in FIGS. 1-3 are implemented using one or more computers. FIG. 4 is a high-level block diagram illustrating an example computer 400. The computer 400 includes at least one processor 402 coupled to a chipset 404. The chipset 404 includes a memory controller hub 420 and an input/output (I/O) controller hub 422. A memory 406 and a graphics adapter 412 are coupled to the memory controller hub 420, and a display 418 is coupled to the graphics adapter 412. A storage device 408, keyboard 410, pointing device 414, and network adapter 416 are coupled to the I/O controller hub 422. Other embodiments of the computer 400 have different architectures.

The storage device 408 is a non-transitory computer-readable storage medium such as a hard drive, compact disk read-only memory (CD-ROM), DVD, or a solid-state memory device. The memory 406 holds instructions and data used by the processor 402. The pointing device 414 is a mouse, track ball, or other type of pointing device, and is used in combination with the keyboard 410 to input data into the computer system 400. The graphics adapter 412 displays images and other information on the display 418. The network adapter 416 couples the computer system 400 to one or more computer networks.

The computer 400 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 408, loaded into the memory 406, and executed by the processor 402.

The types of computers 400 used by the entities of FIGS. 1-3 can vary depending upon the embodiment and the processing power required by the entity. For example, the indexing module 112 might comprise multiple blade servers working together to provide the functionality described herein. The computers 400 can lack some of the components described above, such as keyboards 410, graphics adapters 412, and displays 418.

Figure 5:
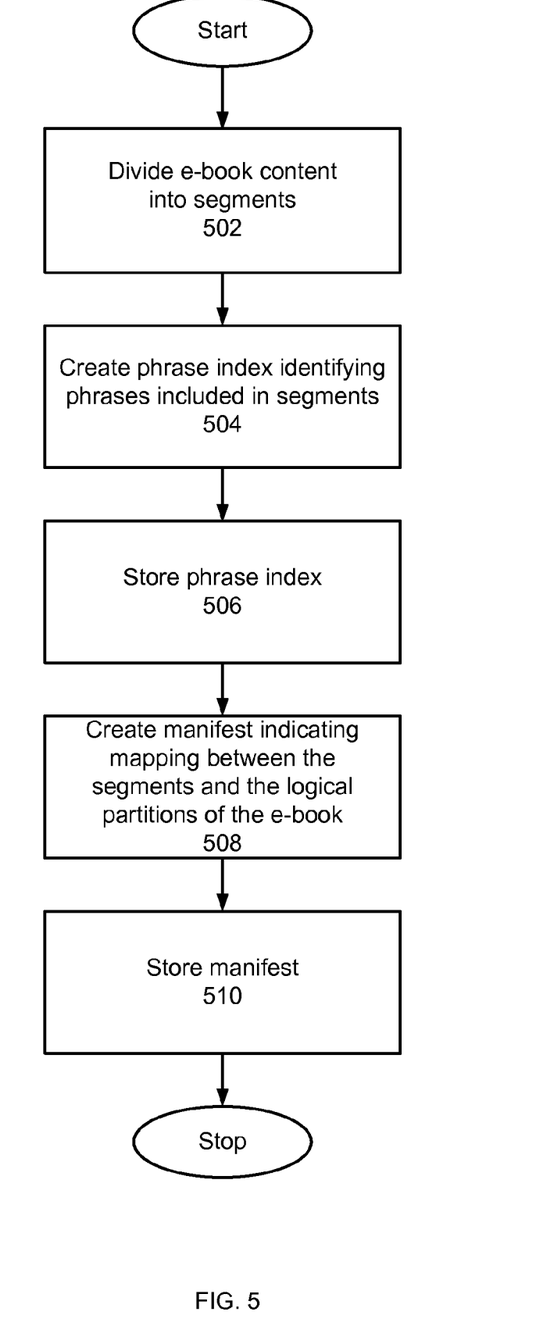
FIG. 5 is a flow diagram illustrating a method for creating and storing index information for e-book content according to one embodiment.

FIG. 5 is a flow diagram illustrating a method for creating and storing index information for e-book content according to one embodiment of the present disclosure. In step 502, the e-book server 104 receives content for an e-book and divides the content into segments. In step 504, the e-book server 104 creates a phrase index by identifying phrases and their corresponding segments in the e-book. In step 506, the e-book server 104 stores the created phrase index. In one embodiment, the e-book server 104 also creates (step 508) and stores (step 510) a manifest for the e-book. The created manifest includes a mapping between the logical partitions and segments that include the encrypted text of the partitions. Accordingly, in step 508, the e-book server 104 identifies e-book logical partitions corresponding to various segments and, in step 510, stores the mapping between the segments and the logical partitions in the manifest.

Figure 6:
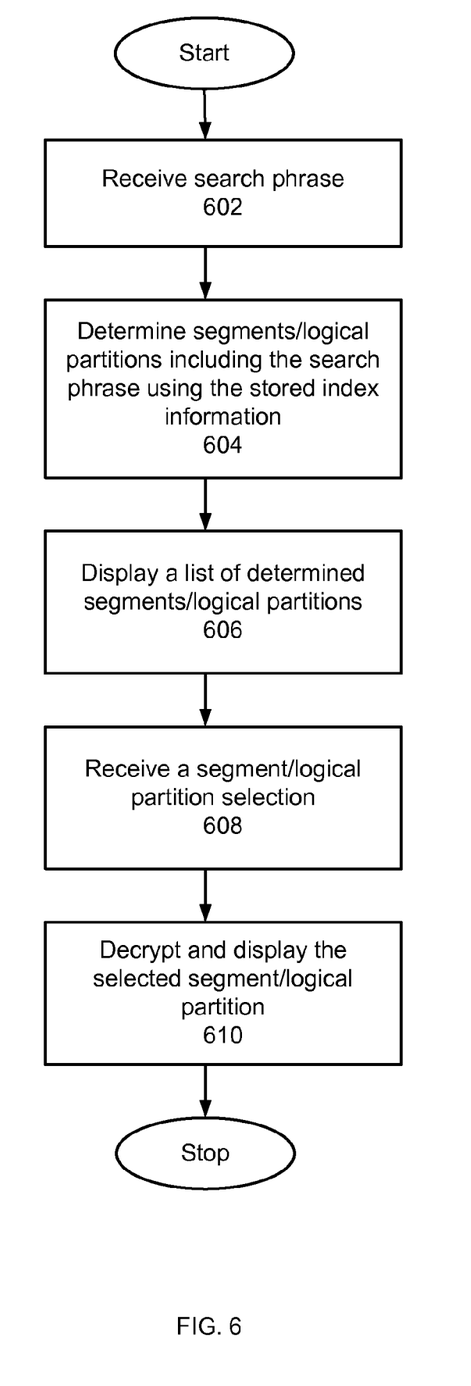
FIG. 6 is a flow diagram illustrating a method for searching the e-book content using stored index information according to one embodiment.

FIG. 6 is a flow diagram illustrating a method for searching the e-book content using stored index information according to one embodiment of the present disclosure. In step 602, the eReader module 122 receives a search phrase and, in step 604, determines the segments of the e-book that include the received search phrase. The eReader module 122 determines the segments or the logical partitions based on the index information for the e-book. Next, in step 606, the eReader module 122 displays the list of identifications for the determined segments or logical partitions to the user and the user selects a segment or a logical partition from the list. In step 608, the eReader module 122 receives the selection, and in step 610, decrypts the segment corresponding to the selection, and displays the decrypted segment to the user.

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the art to most effectively convey the substance of their work to others skilled in the art. An algorithm is here, and generally, conceived to be a self-consistent sequence of steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The figures and the description above relate to various embodiments by way of illustration only. It should be noted that from the figures and description in this application, alternative embodiments of the structures and methods disclosed herein will be readily recognized as viable alternatives that may be employed without departing from the principles of what is claimed.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

What is claimed is:

1. A computer-implemented method of creating index information for an e-book having content, the method comprising:
   identifying logical partitions of the e-book content, the content comprising a plurality of phrases located within one or more of the logical partitions;
   creating a plurality of encrypted segments for the e-book, each segment comprising a subset of the e-book content;
   storing index information including a mapping between the phrases located within the one or more logical partitions and the plurality of encrypted segments, the mapping indicating, for a phrase, one or more encrypted segments that include the phrase; and
   providing the encrypted segments for the e-book and the index information to an eReader device, wherein the eReader device is adapted to receive a search query for a search phrase from a user of the eReader device, use the index information to identify one or more encrypted segments that include the search phrase, and, responsive to receiving the search query, decrypt only the one or more encrypted segments that include the search phrase.

2. The computer-implemented method of claim 1, further comprising:
   determining a mapping between the plurality of encrypted segments and the logical partitions of the e-book indicating the logical partitions of the e-book within each encrypted segment; and
   storing index information including the determined mapping between the plurality of encrypted segments and the logical partitions of the e-book.

3. The computer-implemented method of claim 2, further comprising:
   determining a hierarchy amongst the logical partitions; and
   storing index information including the determined hierarchy;
   wherein the eReader device is further adapted to identify one or more logical partitions corresponding to the identified one or more encrypted segments, identify a hierarchy amongst the identified one or more logical partitions and, responsive to receiving the search query, display the identified hierarchy.

4. The computer-implemented method of claim 1, wherein identifying logical partitions of the e-book further comprises:
   analyzing the content of the e-book to determine textual characteristics indicating boundaries; and
   using the boundaries indicated by the textual characteristics as boundaries of the logical partitions.

5. The computer-implemented method of claim 1, wherein creating a plurality of encrypted segments for the e-book further comprises:
   establishing boundaries for a segment, the boundaries not necessarily aligned with the boundaries of a logical partition;
   determining e-book content within the boundaries for the segment;
   encrypting the determined e-book content; and
   storing the encrypted e-book content in the segment.

6. The computer-implemented method of claim 1, wherein the mapping indicates which of the one or more encrypted segments include the phrase.

7. The computer-implemented method of claim 1, wherein each segment comprises a subset of text of the e-book, and the index information includes a mapping between the phrases located within the one or more logical partitions and the plurality of encrypted segments that comprise text of the e-book including the phrases.

8. A non-transitory computer-readable storage medium storing executable computer program instructions for creating index information for an e-book having content, the computer program instructions comprising instructions for:
- identifying logical partitions of the e-book content, the content comprising a plurality of phrases located within one or more of the logical partitions;
- creating a plurality of encrypted segments for the e-book, each segment comprising a subset of the e-book content;
- storing index information including a mapping between the phrases located within the one or more logical partitions and the plurality of encrypted segments, the mapping indicating, for a phrase, one or more encrypted segments that include the phrase; and
- providing the encrypted segments for the e-book and the index information to an eReader device, wherein the eReader device is adapted to receive a search query for a search phrase from a user of the eReader device, use the index information to identify one or more encrypted segments that include the search phrase, and, responsive to receiving the search query, decrypt only the one or more encrypted segments that include the search phrase.

9. The computer-readable storage medium of claim 8, further comprising instructions for:
- determining a mapping between the plurality of encrypted segments and the logical partitions of the e-book indicating the logical partitions of the e-book within each encrypted segment; and
- storing index information including the determined mapping between the plurality of encrypted segments and the logical partitions of the e-book.

10. The computer-readable storage medium of claim 9, further comprising instructions for:
- determining a hierarchy amongst the logical partitions; and
- storing index information including the determined hierarchy;
- wherein the eReader device is further adapted to identify one or more logical partitions corresponding to the identified one or more encrypted segments, identify a hierarchy amongst the identified one or more logical partitions and, responsive to receiving the search query, display the identified hierarchy.

11. The computer-readable storage medium of claim 8, wherein the instructions for identifying logical partitions of the e-book further comprise instructions for:
- analyzing the content of the e-book to determine textual characteristics indicating boundaries; and
- using the boundaries indicated by the textual characteristics as boundaries of the logical partitions.

12. The computer-readable storage medium of claim 8, wherein the instructions for creating a plurality of encrypted segments for the e-book further comprise instructions for:
- establishing boundaries for a segment, the boundaries not necessarily aligned with the boundaries of a logical partition;
- determining e-book content within the boundaries for the segment;
- encrypting the determined e-book content; and
- storing the encrypted e-book content in the segment.

13. A computer system for creating index information for an e-book having content, the computer system comprising:
- a non-transitory computer-readable storage medium storing executable computer program instructions, the computer program instructions comprising instructions for:
  - identifying logical partitions of the e-book content, the content comprising a plurality of phrases located within one or more of the logical partitions;
  - creating a plurality of encrypted segments for the e-book, each segment comprising a subset of the e-book content;
  - storing index information including a mapping between the phrases located within the one or more logical partitions and the plurality of encrypted segments, the mapping indicating, for a phrase, one or more encrypted segments that include the phrase; and
  - providing the encrypted segments for the e-book and the index information to an eReader device, wherein the eReader device is adapted to receive a search query for a search phrase from a user of the eReader device, use the index information to identify one or more encrypted segments that include the search phrase, and, responsive to receiving the search query, decrypt only the one or more encrypted segments that include the search phrase; and
- a processor for executing the computer program instructions.

14. The computer system of claim 13, further comprising instructions for:
- determining a mapping between the plurality of encrypted segments and the logical partitions of the e-book indicating the logical partitions of the e-book within each encrypted segment; and
- storing index information including the determined mapping between the plurality of encrypted segments and the logical partitions of the e-book.

15. The computer system of claim 14, further comprising instructions for:
- determining a hierarchy amongst the logical partitions;
- storing index information including the determined hierarchy;
- wherein the eReader device is further adapted to identify one or more logical partitions corresponding to the identified one or more encrypted segments, identify a hierarchy amongst the identified one or more logical partitions and, responsive to receiving the search query, display the identified hierarchy.

16. The computer system of claim 13, wherein the instructions for identifying logical partitions of the e-book further comprise instructions for:
- analyzing the content of the e-book to determine textual characteristics indicating boundaries; and
- using the boundaries indicated by the textual characteristics as boundaries of the logical partitions.

17. The computer system of claim 13, wherein the instructions for creating a plurality of encrypted segments for the e-book further comprise instructions for:
- establishing boundaries for a segment, the boundaries not necessarily aligned with the boundaries of a logical partition;
- determining e-book content within the boundaries for the segment;
- encrypting the determined e-book content; and
- storing the encrypted e-book content in the segment.

* * * * *

UNITED STATES PATENT AND TRADEMARK OFFICE
CERTIFICATE OF CORRECTION

PATENT NO. : 9,116,991 B2
APPLICATION NO. : 13/211191
DATED : August 25, 2015
INVENTOR(S) : Gopal Venu Vemula et al.

It is certified that error appears in the above-identified patent and that said Letters Patent is hereby corrected as shown below:

In the Claims:
Column 12, line 36, replace "determining a hierarchy amongst the logical partitions;," with
--determining a hierarchy amongst the logical partitions; and--.

Signed and Sealed this
Second Day of August, 2016

Michelle K. Lee
*Director of the United States Patent and Trademark Office*